(12) United States Patent
Benthien et al.

(10) Patent No.: US 8,623,160 B2
(45) Date of Patent: Jan. 7, 2014

(54) METHOD OF REPAIRING AN AIRCRAFT STRUCTURE COMPONENT

(75) Inventors: Hermann Benthien, Sottrum (DE); Axel Soeffker, Sottrum (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/311,627

(22) Filed: Dec. 6, 2011

(65) Prior Publication Data

US 2012/0152438 A1 Jun. 21, 2012

Related U.S. Application Data

(60) Provisional application No. 61/419,987, filed on Dec. 6, 2010.

(30) Foreign Application Priority Data

Dec. 6, 2010 (DE) .......................... 10 2010 053 569

(51) Int. Cl.
*B29C 73/00* (2006.01)
*B32B 43/00* (2006.01)

(52) U.S. Cl.
USPC ................................ 156/94; 156/98; 156/83

(58) Field of Classification Search
USPC .................. 156/98, 94, 83, 293; 52/2.13, 2.11
See application file for complete search history.

(56) References Cited

U.S. PATENT DOCUMENTS

| | | | | |
|---|---|---|---|---|
| 3,661,683 A | * | 5/1972 | Engel et al. .................. | 156/580 |
| 4,029,128 A | * | 6/1977 | Yamagishi .................... | 138/89 |
| 4,390,333 A | * | 6/1983 | Dubois ......................... | 425/11 |
| 4,652,319 A | * | 3/1987 | Hammond .................... | 156/94 |
| 4,842,663 A | * | 6/1989 | Kramer ........................ | 156/98 |
| 4,961,799 A | | 10/1990 | Cologna et al. | |
| 5,374,388 A | * | 12/1994 | Frailey ......................... | 264/510 |
| 5,442,156 A | * | 8/1995 | Westerman et al. .......... | 219/243 |
| 5,846,362 A | * | 12/1998 | Chung .......................... | 156/94 |
| 5,975,183 A | * | 11/1999 | Reis et al. .................... | 156/580 |
| 6,063,177 A | * | 5/2000 | Meda et al. .................. | 106/38.25 |
| 6,099,948 A | * | 8/2000 | Paver, Jr. ..................... | 428/304.4 |
| 6,321,793 B1 | * | 11/2001 | Czaplicki et al. ............. | 138/93 |
| 6,398,992 B1 | * | 6/2002 | Jacobson ...................... | 264/37.1 |

(Continued)

FOREIGN PATENT DOCUMENTS

WO     WO 9721543 A1 *   6/1997   ............. B32B 35/00

OTHER PUBLICATIONS

Technical Manual. Organizational and intermediate maitenance. General Compoposite Repair. NAVAIR 01-1A-21. Sep. 1, 2005. 0801LP1046361.*

*Primary Examiner* — Michael Orlando
*Assistant Examiner* — Marta Dulko
(74) *Attorney, Agent, or Firm* — Barnes & Thornburg LLP

(57) ABSTRACT

A method is provided for repairing an aircraft structural component which has a component fault in a portion adjoining a cavity of the aircraft structural component. The method includes removing a region of the aircraft structural component that has the component fault, introducing an expansion body into the cavity of the aircraft structural component through an opening that has been formed by the removal of the region of the aircraft structural component having the component fault, wherein the expansion body while being introduced into the cavity of the aircraft structural component is in a non-expanded state, converting the expansion body that has been introduced into the cavity of the aircraft structural component to an expanded state, and closing the opening by means of a repair material.

8 Claims, 7 Drawing Sheets

(56) References Cited

U.S. PATENT DOCUMENTS

| | | |
|---|---|---|
| 6,632,502 B1 * | 10/2003 | Allen et al. .................... 428/119 |
| 6,656,299 B1 * | 12/2003 | Grosskrueger et al. ......... 156/98 |
| 6,770,349 B2 | 8/2004 | Itoh et al. |
| 7,497,981 B2 * | 3/2009 | Graham ........................ 264/266 |
| 7,935,205 B2 * | 5/2011 | Bogue et al. .................... 156/98 |
| 8,356,649 B2 * | 1/2013 | Cacace et al. ................. 156/382 |
| 8,475,615 B2 * | 7/2013 | Deleris et al. .................... 156/98 |
| 2003/0075259 A1 * | 4/2003 | Graham ........................... 156/94 |
| 2007/0023572 A1 * | 2/2007 | Muller et al. .................. 244/121 |
| 2009/0258185 A1 * | 10/2009 | Holland et al. ................ 428/116 |
| 2010/0007056 A1 * | 1/2010 | Jacob et al. .................... 264/320 |
| 2010/0314029 A1 | 12/2010 | Lindgren et al. |
| 2011/0225796 A1 * | 9/2011 | Okutan ............................ 29/428 |
| 2011/0232829 A1 * | 9/2011 | Cacace et al. ................... 156/94 |
| 2012/0061006 A1 * | 3/2012 | Marquardt ....................... 156/94 |

* cited by examiner

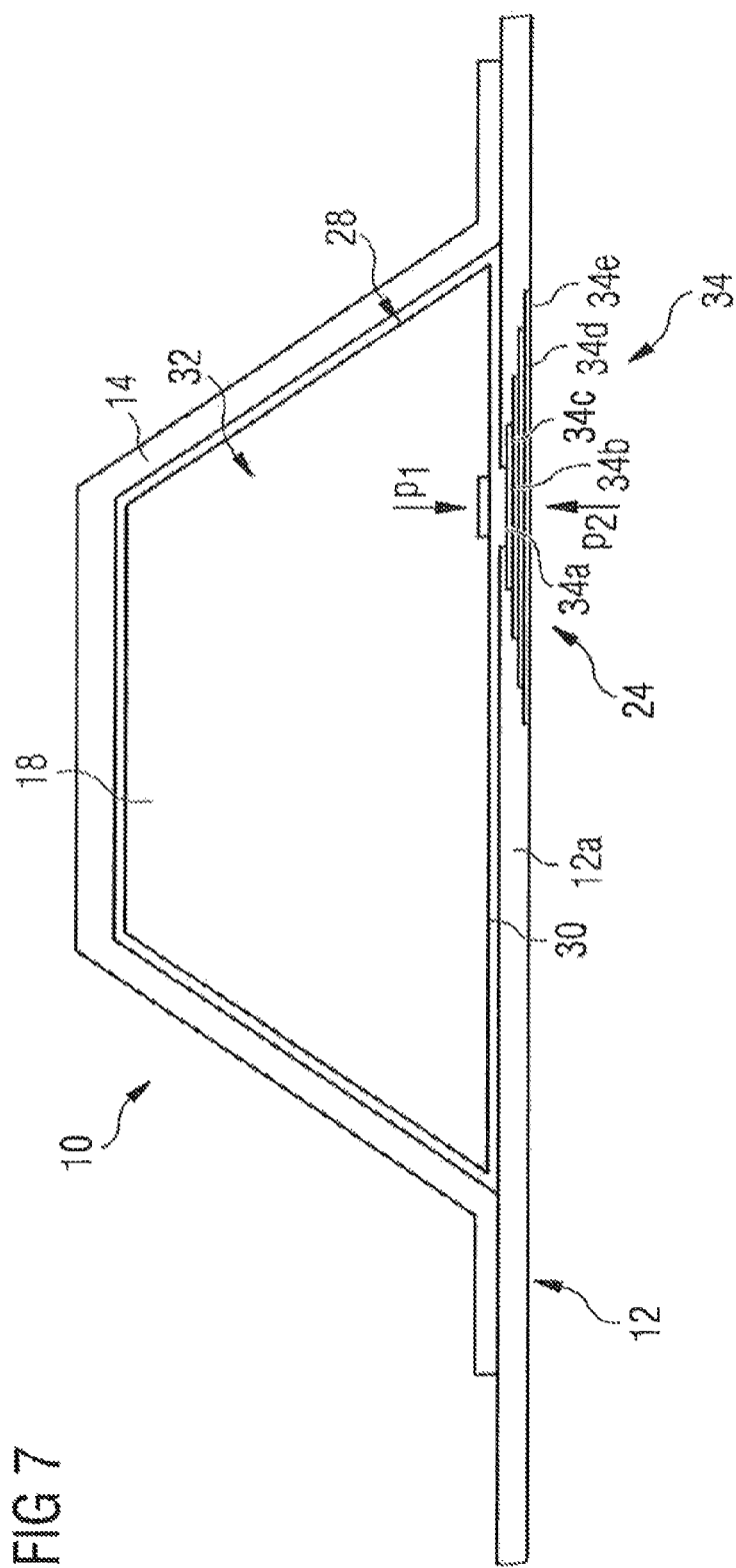

METHOD OF REPAIRING AN AIRCRAFT STRUCTURE COMPONENT

CROSS-REFERENCE TO RELATED APPLICATIONS

This application claims priority to, and the benefit of, German Patent Application No. 102010053569.9 and U.S. Provisional Patent Application No. 61/419,987 both filed Dec. 6, 2010, the disclosures of which are each incorporated herein by reference.

FIELD OF THE INVENTION

The invention relates to a method of repairing an aircraft structural component that is made in particular of a fibre-reinforced composite material.

BACKGROUND

In aircraft construction attempts are being made increasingly to use, as load-bearing components, components that are made entirely or partially from fibre-reinforced composite materials, for example carbon fibre-reinforced plastics (CFP). For example DE 10 2007 062 111 A1 describes a crossmember structure made of carbon fibre-reinforced plastics material, which is used to support the individual panels of an aircraft floor system for dividing a passenger cabin from a cargo compartment disposed underneath the passenger cabin. It is further known for example from DE 10 2004 001 078 A1 to provide aircraft fuselage segments with a skin of a sandwich structure and with reinforcing elements (for example frames, stringers) made of fibre-reinforced composite materials.

During the manufacture—represented in FIG. 1—of an aircraft structural component 10 in the form of an aircraft fuselage segment from a fibre-reinforced composite material, reinforcing fibre layers impregnated with synthetic resin are first brought into a desired shape of a surface portion 12, which forms an aircraft skin, and a reinforcing portion 14, which forms a frame or stringer. The surface portion 12 and the reinforcing portion 14 are then joined to one another "wet in wet", i.e. without prior curing of the synthetic resin forming a matrix of the fibre-reinforced composite material, in an autoclave. During the treatment in the autoclave a steel mould 16, which receives the surface portion 12 and the reinforcing portion 14, guarantees the dimensional stability of the external contours of the aircraft structural component 10. Furthermore, for additionally stabilizing the shape of the reinforcing portion 14 a tube 20 is introduced into a cavity 18 that is delimited by a region 12a of the surface portion 12 and by the reinforcing portion 14. The tube 20 is loaded with an internal pressure and therefore exerts a corresponding internal pressure on the region 12a of the surface portion 12 and the reinforcing portion 14 that delimit the cavity 18.

Particularly during the processing of composite materials having a matrix of a thermoset plastics material there is always the risk that during the curing process in the autoclave, which to once started is no longer reversible, pores or stresses may arise in the matrix of the composite material and necessitate a secondary finishing and/or repair of the aircraft structural component 10. Particularly problematical, here, are component faults such as pores in a region of the aircraft structural component 10 adjoining the cavity 18, because repair of these component faults entails removing and then replacing the damaged component region.

SUMMARY

The invention is geared to the object of indicating a method of repairing an aircraft structural component that makes it possible, when replacing a removed component region adjoining a cavity of the aircraft structural component, to guarantee the required dimensional stability of the aircraft structural component in a comparatively simple and convenient manner.

This object is achieved by a method of repairing an aircraft structural component having the features of claim 1.

The method according to the invention is used to repair an aircraft structural component that has a component fault in a region adjoining a cavity of the aircraft structural component. The aircraft structural component may be for example an aircraft fuselage segment that comprises a surface portion, which forms an aircraft skin, and a reinforcing portion, which forms a reinforcing element such as a frame or a stringer. The cavity of the aircraft structural component is then delimited by the reinforcing portion applied to the surface portion and by a region of the surface portion that is "bridged" by the reinforcing portion. The component fault to be repaired by means of the repair method according to the invention may be situated for example in the reinforcing portion or in the region of the surface portion that is "bridged" by the reinforcing portion.

The aircraft structural component that is to be repaired by means of the method according to the invention is made preferably of a fibre-reinforced plastics material, the matrix of which may, if need be, consist of a thermosetting or a thermoplastic polymer material. As reinforcing fibres, which may take the form of chopped strands or continuous strands, carbon fibres but also other suitable fibres, such as for example glass fibres, may be used. The fibres may be arranged unidirectionally or be present in the form of nonwoven or woven fabrics. Manufacture of the to aircraft structural component that is to be repaired by means of the repair method according to the invention is effected preferably by means of an autoclave process, during which the polymer material forming the matrix of the fibre-reinforced composite material is cured. During the autoclave process, if need be, a plurality of individual components of the aircraft structural component, for example a surface portion and a reinforcing portion may be joined to one is another "wet in wet". The component fault that is to be repaired by means of the repair method according to the invention may be pores. The method according to the invention may however also be used to repair other component faults, for example regions of the aircraft structural component deformed by stresses or the like.

In the method according to the invention of repairing an aircraft structural component, first the region of the aircraft structural component that has the component fault is removed. The region of the aircraft structural component having the component fault may be for example cut out of the aircraft structural component. It is self-evident that removal of the region of the aircraft structural component that has the component fault is effected preferably over an area that is as small as possible but of sufficient size that after the removal step only fault-free regions of the aircraft structural component remain. Removing the region of the aircraft structural component that has the component fault creates an opening that opens out into the cavity formed in the aircraft structural component.

In the next step an expansion body is introduced into the cavity of the aircraft structural component. Introduction of the expansion body into the cavity is effected through the opening created by removing the region of the aircraft structural component that has the component fault. The expansion body, while being introduced into the cavity of the aircraft structural component, is in a non-expanded state. This allows the expansion body to be introduced into the cavity of the aircraft structural component even through an opening having a small opening cross section.

The expansion body introduced into the cavity of the aircraft structural component is then converted to an expanded state. In its expanded state the expansion body at least partially, preferably completely overlaps the removed region of the aircraft structural component. The expansion body in its expanded state moreover preferably lies against the surfaces of the aircraft structural component that delimit the cavity of the aircraft structural component. For to example the expansion body in its expanded state may lie against the inner surfaces, facing the cavity, of a reinforcing portion and of a region of a surface portion that is "bridged" by the reinforcing portion.

Finally, the opening created by removing the region of the aircraft structural component that has is the component fault is closed by means of a repair material. As a repair material, use is preferably made of a material that is also used to manufacture the aircraft structural component. Thus, if the aircraft structural component is a component made of a fibre-reinforced composite material, the opening is closed preferably also by means of a repair material consisting of a fibre-reinforced composite material.

In the repair method according to the invention the expansion body, which is introduced into the cavity of the aircraft structural component and converted there to its expanded state, forms a "support" for the repair material used to close the opening. The expansion body therefore guarantees the dimensional stability of the aircraft structural component that is to be repaired, without there being any need to introduce the aircraft structural component into a mould. It is moreover possible to dispense with loading the cavity of the aircraft structural component with an internal pressure by means of a tube, which takes up a large volume of the cavity and consequently cannot be introduced into the cavity through the opening created by the removal of the region of the aircraft structural component that has the component fault. The repair method according to the invention is therefore easy and convenient to implement. The method moreover enables small-scale removal of the region of the aircraft structural component that has the component fault, i.e. regions of the aircraft structural component that lie adjacent to the region having the component fault are not damaged during implementation of the repair method according to the invention.

Preferably during closing of the opening by means of the repair material a pressure is exerted on an outer surface of the repair material that faces away from the cavity of the aircraft structural component. In this way, the dimensional stability of the aircraft structural component during replacement of the removed region of the aircraft structural component is guaranteed. The aircraft structural component in the area surrounding the opening may moreover be exposed to a raised temperature of for example ca. 125° C. during closing of the opening. A to raised temperature enables easy and rapid curing of a hardenable polymer material that forms the matrix of a repair material consisting of a fibre-reinforced composite material.

In a preferred embodiment of the method according to the invention, during closing of the opening by means of the repair material the expansion body in its expanded state exerts a pressure on an inner surface of the repair material facing the cavity of the aircraft structural component. In other words, the expansion body preferably presses upon an inner surface of the repair material facing the cavity of the aircraft structural component, i.e. the expansion body fulfils a support function for the repair material and hence ensures that the repair material during closing of the opening assumes the desired shape. If desired, before the expansion body is converted to its expanded state, a vacuum may be applied to the cavity of the aircraft structural component, i.e. the cavity of the aircraft structural component may be placed under a pressure that is below atmospheric pressure.

The pressure, which during closing of the opening by means of the repair material the expansion body in its expanded state exerts on the inner surface of the repair material facing the cavity of the aircraft structural component, preferably corresponds substantially to the pressure, which during closing of the opening by means of the repair material is exerted on the outer surface of the repair material that faces away from the cavity of the aircraft structural component. The exerting of a pressure on both sides of the repair material guarantees that the repair material used to close the opening assumes the desired shape.

The expansion body may comprise a balloon made of a heat-resistant expandable plastics material. The expansion body then simultaneously combines a simple construction with good functionality. The balloon may be made for example of a silicone material or the like.

The expansion body is preferably converted to its expanded state by introducing a self-hardening foam material into the expansion body. A self-hardening foam material rapidly and easily lends the expansion body the desired expanded shape. Furthermore, after hardening of the foam material the expansion body is dimensionally stable and consequently capable of exerting a pressure on an inner surface of the repair material facing the cavity of the aircraft structural component. The pressure that is to be exerted by the expansion body on the inner surface of the repair material facing the cavity of the aircraft structural component may be controlled in a desired manner by corresponding control of the volume of the foam material to be introduced into the expansion body and by the material properties of the foam material. A further advantage of the self-hardening foam material is its low weight, i.e. an expansion body is filled with a self-hardening foam material only insignificantly increases the weight of the aircraft structural component. After repair of the aircraft structural component the expansion body may therefore be left where it is, without this causing any problems.

The self-hardening foam material may be introduced into the expansion body by means of a lance, which during introduction of the self-hardening foam material into the expansion body projects into the cavity of the aircraft structural component through the opening created by the removal of the region of the aircraft structural component that has the component fault. A lance may be designed with a relatively small cross section and may consequently be introduced without difficulty through the opening into the cavity of the aircraft structural component, without there being any need to design the opening with a particularly large opening cross section.

After hardening of the foam material the lance is preferably removed from the expansion body, i.e. the lance after hardening of the foam material no longer projects through the opening and therefore does not impede replacement of the removed region of the aircraft structural component.

The region of the aircraft structural component that has the component fault is removed preferably in steps, wherein a cross section of the opening formed in the aircraft structural component by removal of the region of the aircraft structural component having the component fault preferably increases stepwise from an inner surface of the aircraft structural component that adjoins the cavity of the aircraft structural component in the direction of an outer surface of the aircraft structural component that is remote from the cavity of the aircraft structural component.

The removed region of the aircraft structural component is preferably replaced by means of a plurality of superimposed repair material layers. If the repair material layers are repair material layers of a fibre-reinforced composite material, the repair material layers are introduced into the to opening preferably "wet in wet", i.e. without prior curing of the polymer material that forms a matrix of the fibre-reinforced composite material. In one step the repair material layers are then cured and joined to one another as well as to the aircraft structural component.

If the region of the aircraft structural component that has the component fault is removed in steps, an inner repair material layer adjoining the cavity of the aircraft structural component preferably has a smaller area than an outer repair material layer that faces away from the cavity of the aircraft structural component. In other words, the opening is closed preferably by means of a tapered overlap of a plurality of repair material layers.

BRIEF DESCRIPTION OF DRAWINGS

There now follows a detailed description of a preferred embodiment of the invention with reference to the accompanying diagrammatic drawings, which show FIG. 1 the manufacture of an aircraft structural component configured in the form of an aircraft fuselage segment from a fibre-reinforced composite material, FIG. 2 an aircraft structural component configured in the form of an aircraft fuselage segment, which has a component fault in a region adjoining a cavity of the aircraft structural component, FIG. 3 the aircraft structural component according to FIG. 2, wherein however the region of the aircraft structural component having the component fault has been removed, thereby forming in the aircraft structural component an opening that opens out into the cavity of the aircraft structural component, FIG. 4 the aircraft structural component according to FIG. 3, wherein however a lance having an expansion body in a non-expanded state has been introduced into the cavity of the aircraft structural component through the removed region of the aircraft structural component, FIG. 5 the aircraft structural component according to FIG. 4, wherein however the expansion body has been converted to an expanded state, FIG. 6 the aircraft structural component according to FIG. 5, wherein however the lance has been removed from the expansion body, which is in its expanded state, and FIG. 7 the aircraft structural component according to FIG. 6, wherein however the opening has been closed by means of a repair material.

DESCRIPTION OF THE ILLUSTRATIVE EMBODIMENTS

Figure 1:
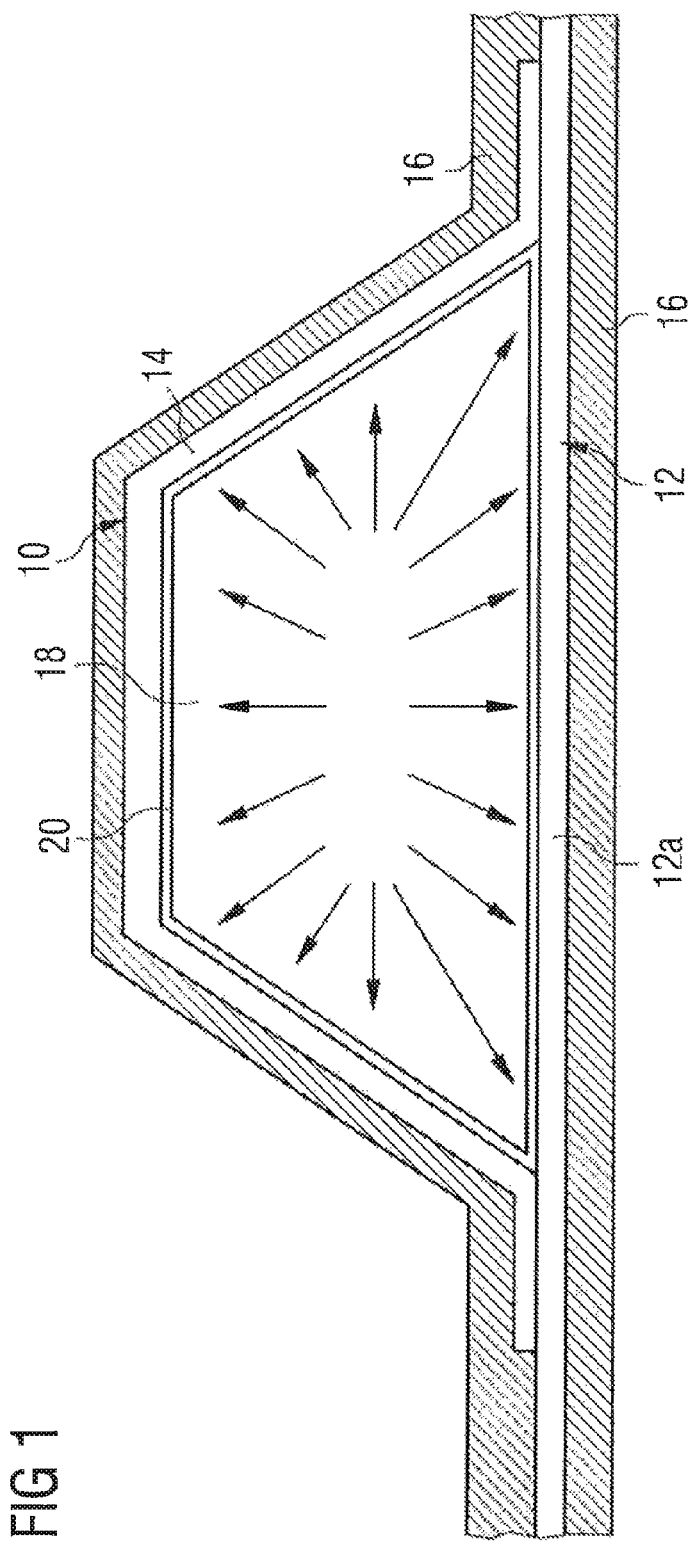
Figure 2:
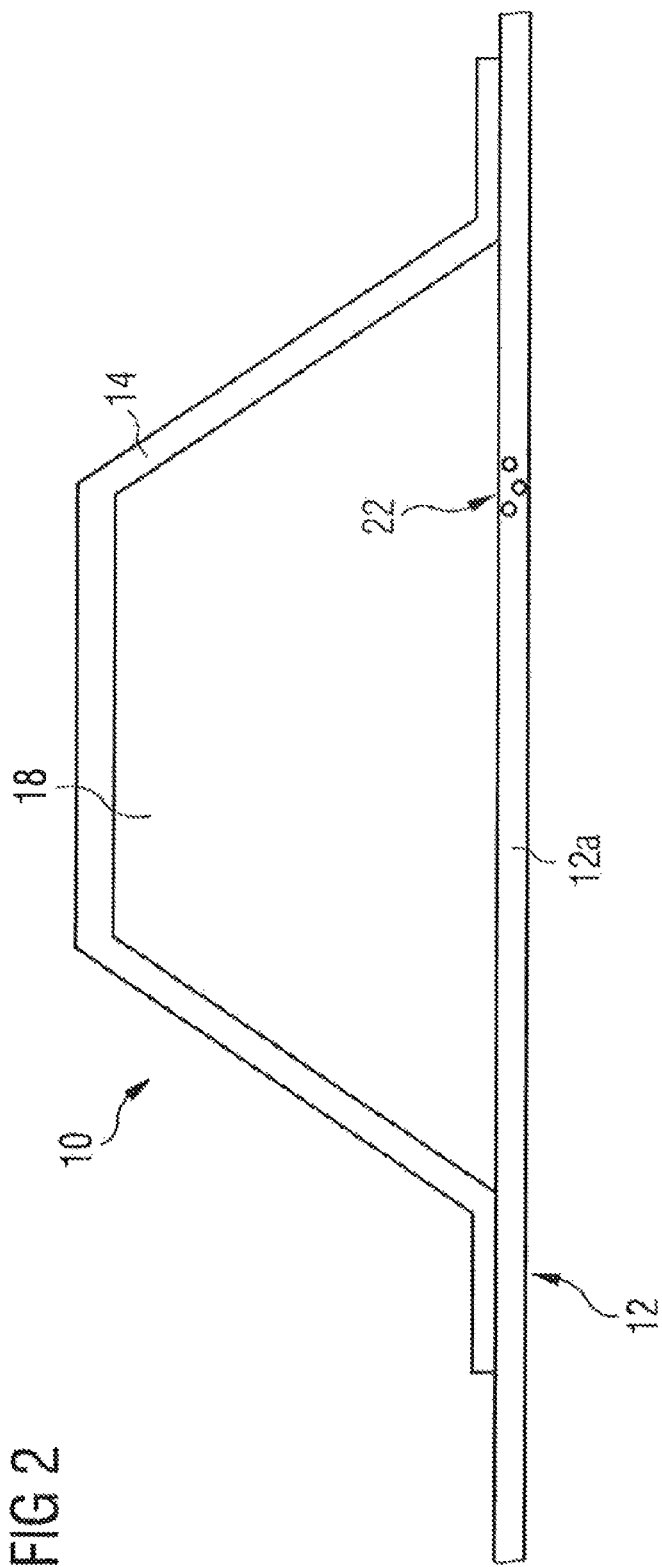

FIG. 2 shows an aircraft structural component 10 configured in the form of an aircraft fuselage segment, which is made of a fibre-reinforced composite material and has been manufactured in accordance with the method shown in FIG. 1, i.e. by "wet-in-wet" joining of a surface portion 12 and a reinforcing portion 14 that forms a frame or stringer and subsequent curing in an autoclave. The reinforcing portion 14 together with a region 12a of the surface portion 12 that is "bridged" by the reinforcing portion 14 delimits a cavity 18. In the region 12a of the surface portion 12 the aircraft structural component 10 has a component fault 22 formed by pores. Owing to the high stability under load that is required of aircraft structural components, the aircraft structural component 10 has to be repaired in the region of the component fault 22.

Figure 3:
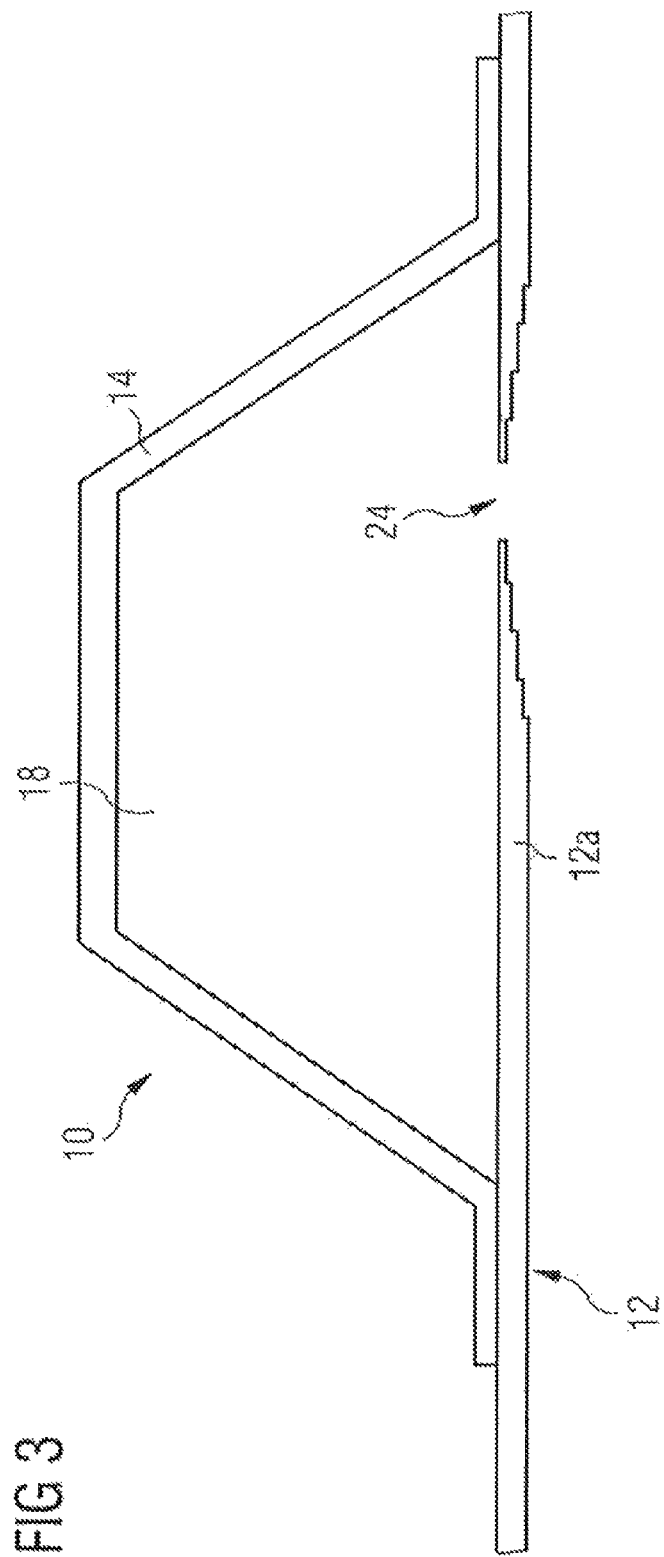

For this purpose, as is shown in FIG. 3, a region of the aircraft structural component 10 that has the component fault 22 first has to be removed in such a way that regions of the aircraft structural component that impair the mechanical properties of the aircraft structural component are fully removed. Removal of the region of the aircraft structural component 10 that has the component fault 22 is effected in steps in such a way that an opening 24 that is formed as a result of removing the region in the aircraft structural component 10, i.e. in the region 12a of the surface portion 12 adjoining the cavity 18, has a smaller cross section in the region of an inner surface of the region 12a of the surface portion 12 that adjoins the cavity 18 than in the region of an outer surface of the region 12a of the surface portion 12 that faces away from the cavity 18.

Figure 4:
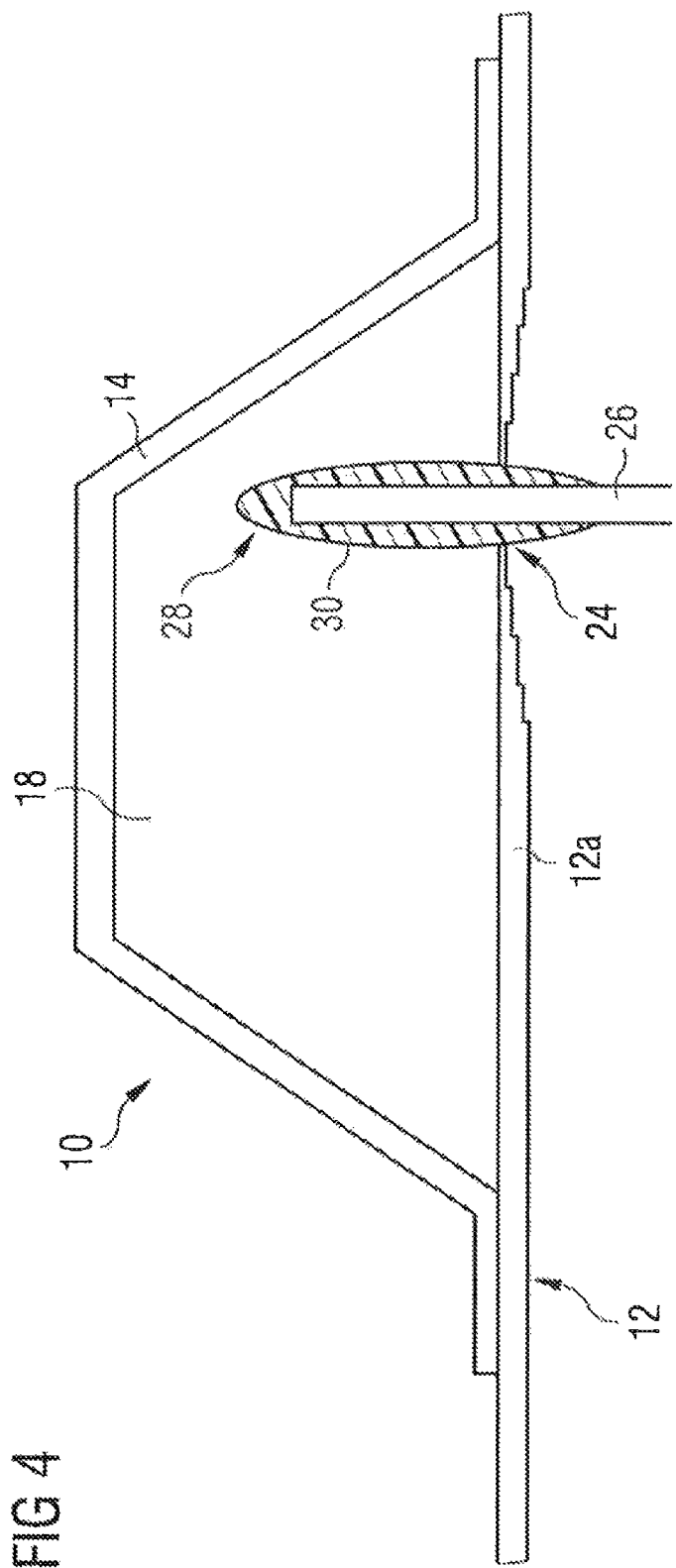

In the next step, as is shown in FIG. 4, a lance 26 is introduced through the opening 24 of the aircraft structural component 10 into the cavity 18 of the aircraft structural component. The lance 26 carries an expansion body 28, which while being introduced into the cavity 18 of the aircraft structural component 10 is in a non-expanded state. The expansion body 28 comprises a balloon 30 that is made of a heat-resistant expandable plastics material, for example a silicone material.

Figure 5:
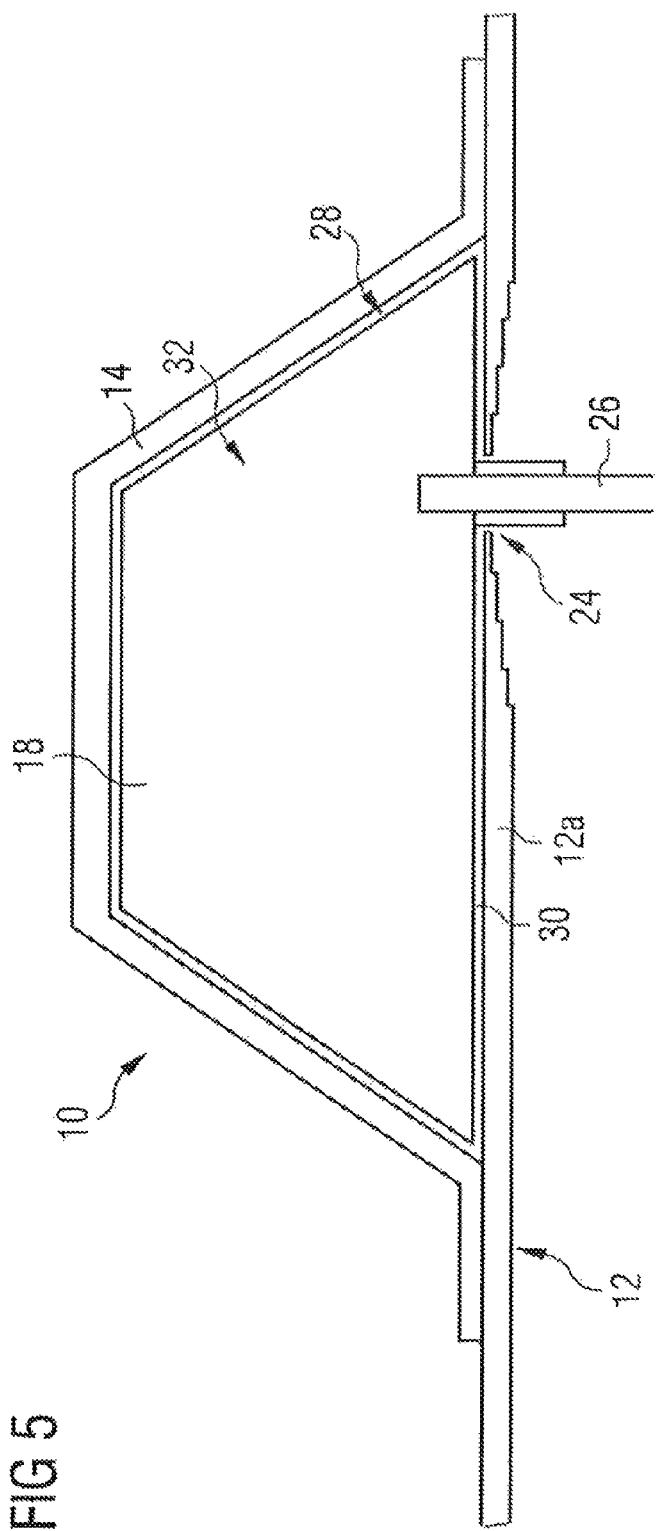

By means of the lance 26 a self-hardening foam material 32 is then introduced into the balloon 30. The expansion body 28, as is shown in FIG. 5, is then converted to an expanded state. Self-hardening foam material 32 is introduced through the lance 26 into the balloon 30 until the expansion body 28 fills the cavity 18 to such an extent that the expansion body 28 exerts a desired pressure $p_1$ on an inner surface of the region 12a of the surface portion 12 that faces the cavity 18 of the aircraft structural component 10. The opening 24 is in this case overlapped completely by the expansion body 28.

Figure 6:
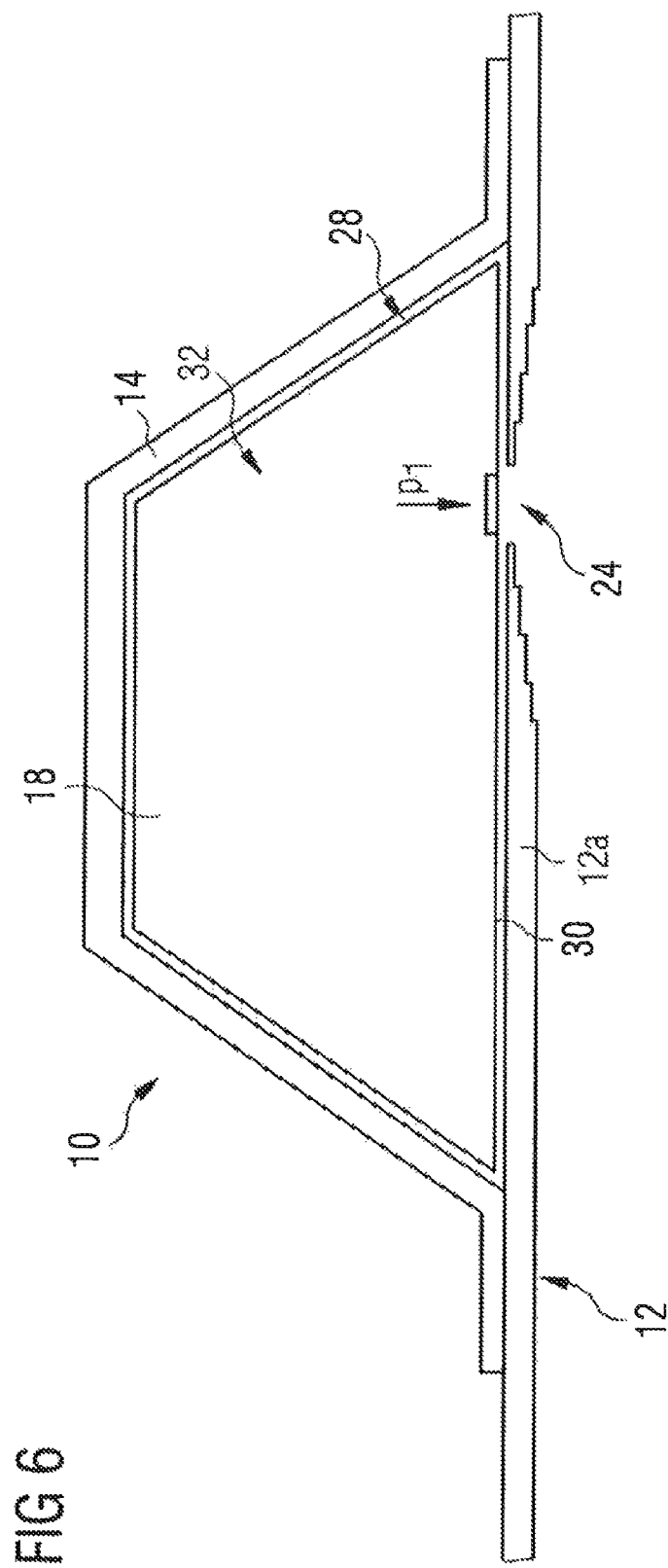

In the next step, hardening of the foam material 32 introduced into the balloon 30 occurs. For this purpose, the foam material 32 may, if need be, be exposed to a raised temperature. After hardening of the foam material 32 the lance 26 is removed from the expansion body 28 so that only the expansion body 28, i.e. the balloon 30 filled with hardened foam material 32, remains in the cavity 18 of the aircraft structural component 10, see FIG. 6.

Finally, the opening 24 is closed by means of a repair material 34. As is shown in FIG. 7, the repair material 34 is introduced in a plurality of superimposed repair material layers 34a to 34e, i.e. in the form of a tapered overlap, into the region of the aircraft structural component 10 that was removed in steps. The dimensions of the repair material layers 34a to 34e are adapted in each case to the shape of the steps in the removed region of the aircraft structural component 10, i.e. an inner repair material layer 34a that adjoins the cavity 18 of the aircraft structural component 10 has a smaller area than an outer repair material layer 34e that is remote from the cavity 18 of the aircraft structural component 10.

The repair material layers 34a to 34e are made of the same material as the surface portion 12 and the reinforcing region 14, i.e. of a fibre-reinforced composite material. During the introduction of the repair material layers 34a to 34e into the opening 24 the polymer material to forming the matrix of the fibre-reinforced composite material is not yet cured, i.e. the repair material layers 34*a* to 34*e* are introduced "wet in wet" into the removed region of the aircraft structural component 10.

In order to join the repair material layers 34*a* to 34*e* to one another as well as to the surface portion 12 of the aircraft fuselage segment 10, in a final step the curing of the repair material layers 34*a* to 34*e* occurs. For this purpose, a pressure $p_2$ is exerted on an outer surface of the surface portion 12, and hence of the repair material 34, that faces away from the cavity 18 of the aircraft structural component 10, which pressure $p_2$ counteracts the pressure $p_1$ that is exerted by the expansion body 28 on an inner surface of the surface portion 12, and hence of the repair material 34, that faces the cavity 18 of the aircraft structural component 10. A particularly high dimensional stability of the repair material 34 is achievable if the pressure $p_1$ exerted by the expansion body 28 corresponds in value approximately to the pressure $p_2$ that is exerted on the outer surface of the repair material 34 that faces away from the cavity 18 of the aircraft structural component 10.

In the presently described method of repairing an aircraft structural component 10, the expansion body 28 therefore acts as a support for the pressure $p_2$ that is to be exerted during curing of the repair material 34 on the outer surface of the repair material 34 that faces away from the cavity 18 of the aircraft structural component 10. After closing of the opening 24 by means of the repair material 34, the expansion body 28 remains where it is. Owing to the low weight of the foam material 32 and the balloon 30, however, this is not disadvantageous.

The invention claimed is:

1. A method of repairing an aircraft structural component, which has a component fault in a portion adjoining a cavity of the aircraft structural component, wherein the method comprises the following steps:

removing a region of the aircraft structural component that has the component fault, introducing an expansion body comprising a balloon made of a heat-resistant expandable plastics material into the cavity of the aircraft structural component through an opening that has been formed in the aircraft structural component by the removal of the region of the aircraft structural component that has the component fault, wherein the expansion body while being introduced into the cavity of the aircraft structural component is in a non-expanded state, converting the expansion body that has been introduced into the cavity of the aircraft structural component to an expanded state such that the expansion body in its expanded state fills the cavity to an extent that it exerts a first pressure on an inner surface of the aircraft structural component that faces the cavity and completely overlaps the opening, and closing the opening by means of a repair material, wherein during closing of the opening by means of the repair material the expansion body in its expanded state exerts the first pressure on the inner surface of the repair material that faces the cavity of the aircraft structural component, and the expansion body is converted to its expanded state by introducing a self-hardening foam material into the expansion body.

2. The method according to claim 1, characterized in that during closing of the opening by means of the repair material a second pressure is exerted on an outer surface of the repair material that faces away from the cavity of the aircraft structural component.

3. The method according to claim 2, characterized in that the first pressure, which during closing of the opening by means of the repair material is exerted by the expansion body in its expanded state on the inner surface of the repair material facing the cavity of the aircraft structural component, corresponds in value substantially to the second pressure, which during closing of the opening by means of the repair material is exerted on the outer surface of the repair material that faces away from the cavity of the aircraft structural component.

4. The method according to claim 1, characterized in that the self-hardening foam material is introduced into the expansion body by means of a lance, which during introduction of the self-hardening foam material into the expansion body projects through the opening into the cavity of the aircraft structural component.

5. The method according to claim 4, characterized in that after hardening of the foam material the lance is removed from the expansion body.

6. The method according to claim 1, characterized in that the region of the aircraft structural component that has the component fault is removed in steps.

7. The method according to claim 1, characterized in that the opening is closed by means of a plurality of superimposed repair material layers.

8. The method according to claim 7, characterized in that an inner repair material layer that adjoins the cavity of the aircraft structural component has a smaller area than an outer repair material layer that faces away from the cavity of the aircraft structural component.

* * * * *